April 21, 1936.  H. C. RENTSCHLER  2,037,925
APPARATUS FOR MEASURING RADIATIONS
Filed July 30, 1932
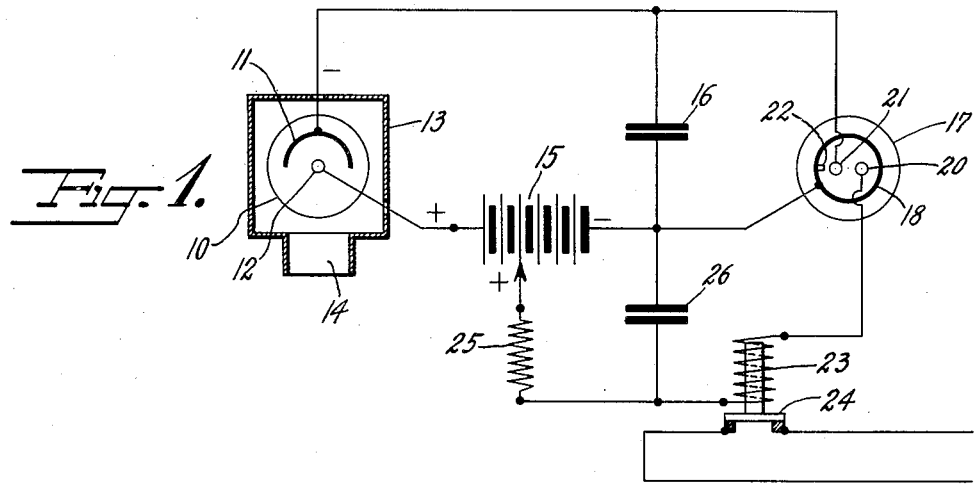
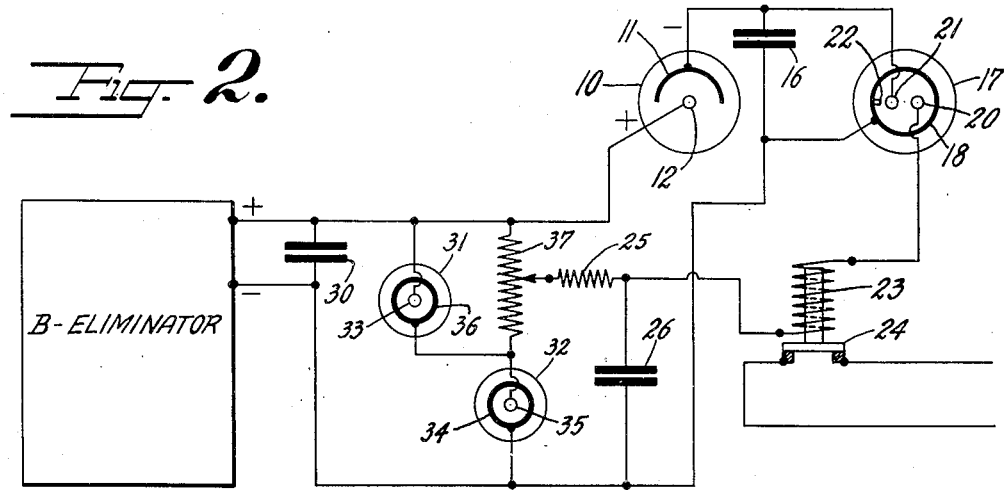
INVENTOR
H. C. RENTSCHLER
BY
ATTORNEY Patented Apr. 21, 1936

2,037,925

UNITED STATES PATENT OFFICE 2,037,925

APPARATUS FOR MEASURING RADIATIONS

Harvey Clayton Rentschler, East Orange, N. J., assignor to Westinghouse Lamp Company, a corporation of Pennsylvania Application July 30, 1932, Serial No. 626,381

8 Claims. (Cl. 250—41.5)

The invention relates to a new method and apparatus for measuring the quantity or amount of visible and/or invisible radiations at a particular location or emitted from a specific source. More specifically this is an improvement over the invention disclosed in my copending application Serial No. 328,243 filed December 24, 1928 and assigned to the same assignee as the present invention.

An object of my invention is to provide a novel method for measuring the quantity of visible and/or invisible radiations.

Another object of my invention is to provide a new and rugged apparatus for measuring the quantity or amount of visible and/or invisible radiations.

Other objects and advantages of my invention will become readily apparent after a reading of the following description in view of the appended drawing wherein, Figure 1 represents a diagrammatic sketch illustrating one aspect of my invention where direct current is employed;

Figure 2 represents a diagrammatic sketch illustrating an aspect of my invention when alternating current is employed.

The novel system illustrated in Figure 1 comprises essentially an input and an output circuit associated with movable or actuable means. As illustrated, a radiation responsive device in the nature of a photoelectric cell 10, comprising essentially a photo-sensitive cathode 11 and an anode 12, is mounted in a shielding box 13 having an opening or window 14 permeable to the radiations to be measured.

The positive electrode 12 of said radiation responsive device 10 is connected to the positive terminal of a source of potential, for example, a train of storage batteries 15. The negative terminal of said source of potential 15 is connected to one side of a condenser 16 of fixed or variable capacity.

The other side of said condenser is connected to the cathode 11 of the photoelectric device 10. Connected across the condenser 16 is a glow relay device 17 of the starting anode type. This glow relay tube 17 is similar to the one described in by Patent 1,840,055 issued January 5, 1932 and consists essentially of an envelope containing a cathode 18, a main anode 20, and starting anode 21. The envelope has a filling of argon gas at a pressure of about five to eight millimeters of mercury. The cathode, which is of cylindrical form and of relatively large area, has a small projection 22 extending towards the starting anode.

As explained in said patent, this tube may be so constructed that when a predetermined potential is applied between the main anode and the cathode, it will be insufficient to cause a discharge therebetween and when a relatively small predetermined potential is applied between the starting anode and the cathode, it will cause an ionization of the gas within the envelope. The resistance between the main anode and the cathode is lowered at the time this discharge occurs because some of the gas within the envelope has been converted from the atomic or molecular state into an ionized state. When the discharge occurs between the starting anode and the cathode, the predetermined potential that has been maintained between the main anode and the cathode will cause a discharge to occur between the latter two electrodes.

The side of said condenser 16, connected to the cathode 11 of the radiation responsive device 10 is also connected to the auxiliary anode 21 of the glow relay tube 17 and the opposite side of said condenser is connected to the cathode 18 of said glow relay tube. The circuit just described comprises essentially the input circuit of my novel system.

The output circuit of said system comprises a fixed or variable resistance 25 of appropriate value having one end thereof connected to the positive terminal of one of the batteries in the train 15. A relay winding 23 surrounding an actuable armature 24, which may operate a trip counting mechanism or act as a switch, as shown, is connected in series with the glow relay tube 17 and the resistance 25. One end of said winding 23 and one side of a condenser 26 are connected to the other end of said resistance 25. The other end of said winding is connected to the main anode 20 of said glow relay device 17. The other side of said condenser is connected to the negative terminal of said train of batteries 15, which is also connected to the cathode 18 of said glow relay tube 17. Instead of the winding and armature, I may employ a means, as for example a lamp, adapted to light only when the condenser 26 is discharging.

On operation, when no light falls upon the photoelectric cell 10, the resistance thereof is so high despite the fact that such cell may have a small inherent capacity effect nevertheless this is so infinitesimal that no current feeds from the source of potential 15 to the condenser 16. With this condition existing or even when light does fall on the photoelectric cell, a portion of the train of batteries 15 charges the condenser 26 until it is fully charged.

When the condenser 26 is fully charged, the potential between the cathode 18 and the main anode 20 is of insufficient magnitude to cause a discharge therebetween. When light falls upon the cathode 11 of the photoelectric cell 10, electrons are emitted therefrom and the current that may be fed from the train of batteries 15 to the condenser 16 depends upon the magnitude of the photoelectric current. After a predetermined amount of light has fallen upon the cathode 18 of the photoelectric cell, the condenser 16 will have acquired a predetermined charge.

When so charged the potential between the cathode projection 22 and the starting anode 21 is of a sufficient magnitude to cause a discharge therebetween. This discharge causes ionization of some of the gaseous atoms or molecules within the envelope of the glow relay device and exists for a very short period of time, during which period the condenser 16 is discharged. As this discharge occurs the resistance between the cathode 18 and the main anode 20 is lowered so that the potential that has been maintained between the main anode 20 and the cathode 18, due to the fully charged condenser 26, is of sufficient magnitude to cause a discharge therebetween. This discharge also exists for a short period of time. During said period the current that traverses the coil 23 is sufficiently high to cause adequate movement of said armature 24, which may actuate a trip counting mechanism or break a circuit, one line of which is shown.

When the condenser 26 has been discharged the potential between the cathode 18 and the main anode 20 has been considerably reduced and approximates zero so that it is not high enough to maintain the discharge therebetween. The discharge is therefore ended and in order that the discharge may not be maintained and continuous, the resistance 25 provided in series with the condenser 26 and the source of potential 15 limits the rate that the condenser 26 may be charged. This resistance is so chosen that the rate of charging said condenser 26 is higher than the rate that the condenser 16 may be charged, but the rate of charging said condenser 26 is not so high that once the discharge is started between cathode 18 and main anode 20, it will be maintained and continuous.

The novel specific system illustrated in Figure 1 is primarily adapted to be employed when it is desired to utilize direct current because of its sole availability or for other reasons. In order that alternating current may be employed as the original source of electrical energy I have devised the novel system, illustrated in Figure 2, which is essentially a modification of the system illustrated in Figure 1 and hereinbefore described.

The system illustrated in Figure 2 functions in essentially the same manner and is basically the same as the system illustrated in Figure 1. The only difference between these two systems is that in one case a direct current generator, such as the train of batteries 15, serves to charge the condensers 16 and 26, and in the other case a novel means is substituted for said batteries to serve as an electrical energy supply means.

For this purpose I may employ a B-eliminator of the general type heretofore employed in the radio field. Across the output terminals of said B-eliminator is a condenser 30 which acts to further smooth out the direct current derived from said B-eliminator to which is fed alternating current.

A pair of series connected voltage regulators 31 and 32 of the type disclosed in my United States Patent No. 1,835,121 issued December 8, 1931, are connected in electrical parallel with said condenser 30. As shown, the anode 33 of the regulator 31 is connected to that side of the condenser 30 connected to the positive terminal of the B-eliminator, and the cathode 34 of the regulator 32 is connected to the other side of said condenser 30, connected to the negative terminal of said B-eliminator. The anode 35 of the regulator 32 is connected to the cathode 36 of the regulator 31. A variable or fixed resistance 37 of appropriate value is connected in electrical parallel with the regulator 31 and has its respective ends connected to the anode 33 and cathode 36 of said regulator.

Instead of connecting the anode 12 of the photoelectric cell to the positive terminal of a train of battries 15 as shown in Figure 1, it is connected to that end of the resistance 37 at the anode 33 of the regulator 31. That side of the condenser 26 connected to the cathode 18 of the glow relay device 17 is connected to cathode 34 of the regulator 32 instead of to the negative terminal of the batteries 15 as shown in Figure 1. That end of the resistance 25 instead of being connected to the positive terminal of one of the batteries of the train 15 is connected to an appropriate position along the length of the resistance 37.

This system operates in essentially the same manner as that shown in Figure 1 and hereinbefore described. Although I have described my invention with some particularity, it is not to be limited thereby, but only by the prior art.

What is claimed is:

1. A system for measuring the quantity of radiations emanating from a source of electromagnetic radiations comprising means whose resistance varies with variation in intensity of the radiations emanating from said source, a source of electrical potential, a condenser connected to said source of electrical potential and to said means for accumulating a charge therein from said source of electrical potential solely by current flow through said means and only when the same is subjected to said source of electromagnetic radiations, a glow relay tube provided with a common cathode and two anodes with one of said anodes being spaced closer to said cathode than the other of said anodes and located out of the direct discharge path between the other of said anodes and said cathode to inherently cause a definite and constant breakdown potential being required to initiate a discharge between said cathode and the anode spaced in closer proximity thereto regardless of the potential impressed between the other of said anodes and cathode, said condenser being connected to one of said anodes and said cathode and operable to initiate a discharge therebetween when said condenser is charged to the definite breakdown potential thereof, a second condenser having its terminals connected to said source of electrical potential and to the other of said anodes and said cathode, and recording means operably responsive to discharge of said second condenser upon breakdown of said glow relay tube for indicating the quantity of electromagnetic radiations emanating from said source over a definite period of time.

2. A system for measuring the quantity of radiations emanating from a source of electromagnetic radiations, comprising means subjectable to radiations from said source whose resistance varies with variations in intensity of the radiations emanating therefrom, a source of electrical potential, a condenser connected to said source of electrical potential and to said means, and adapted to be charged by said source of electrical potential solely by current flow through said means and only when the same is subjected to said source of electromagnetic radiations until said condenser is charged to a predetermined value at a rate dependent upon the intensity of radiations falling upon said means, a glow relay tube provided with a common cathode, a main anode spaced from said cathode, and a starting anode spaced a lesser distance from said cathode than the main anode and located out of the direct discharge path between the main anode and cathode to inherently cause a definite and constant breakdown potential being required to initiate a discharge between the starting anode and cathode regardless of the potential impressed between the main anode and cathode, said starting anode and cathode being connected to said condenser for causing discharge thereof when the latter has reached the breakdown potential between said starting anode and cathode; a second condenser connected to said source of electrical potential and to said main anode and cathode for limiting the potential impressed upon said main anode and cathode to a value sufficient only to sustain a discharge therebetween for a brief interval upon initiation of a discharge between said starting anode and cathode by discharge of said first mentioned condenser, and recording means operably responsive to discharge of said second mentioned condenser for indicating the quantity of electromagnetic radiations emanating from said source over a definite period of time.

3. A system for measuring the quantity of radiations emanating from a source of electromagnetic radiations, comprising means subjectable to radiations from said source whose resistance varies with variations in tensity of the radiations emanating therefrom, a source of electrical potential, a condenser connected in said source of electrical potential and to said means and adapted to be charged by said source of electrical potential solely by current flow through said means and only when the same is subjected to said source of electromagnetic radiations until said condenser is charged to a predetermined value at a rate dependent upon the intensity of radiations falling upon said means, a glow relay tube provided with two anodes and a common cathode with one of said anodes being spaced closer to said cathode than the other of said anodes and located out of the direct discharge path between the other of said anodes and said cathode to inherently cause a definite and constant breakdown potential being required to initiate a discharge between said cathode and the anode spaced in closer proximity thereto regardless of the potential impressed between the other of said anodes and cathode, and one of said anodes and said cathode being connected in electrical parallel relationship with said condenser to cause discharge of the latter with attendant breakdown of said glow relay tube upon said condenser being charged to said predetermined value, and a second condenser connected to said source of electrical potential and in electrical parallel relationship with the remaining anode and said cathode for limiting the potential impressed therebetween to a fixed maximum sufficient only to sustain a discharge in said glow relay tube after initiation thereof by the discharge of said first mentioned condenser, and operable to discharge in response to the discharge of said first mentioned condenser; and means operable in response to discharge of said second mentioned condenser to indicate the quantity of electromagnetic radiations emanating from said source over a definite period of time.

4. A system for measuring the quantity of radiations emanating from a source of electromagnetic radiations comprising means subjectable to radiations from said source whose resistance varies with variations in intensity of the radiations emanating therefrom, a source of electrical potential, a condenser connected to said source of electrical potential and to said means and adapted to be charged by said source of electrical potential solely by current flow through said means and only when the same is subjected to said source of electromagnetic radiations, a glow relay tube provided with two anodes and a common cathode with one of said anodes being spaced closer to said cathode than the other of said anodes and positioned out of the direct discharge path between the other of said anodes and said cathode to inherently cause a definite and constant breakdown potential being required to initiate a discharge between said cathode and the anode spaced in closer proximity thereto regardless of the potential impressed between the other of said anodes and said cathode, an input circuit for said glow relay tube including said condenser and one of said anodes and said cathode and operable to cause breakdown therebetween with attendant complete discharge of said condenser after the same has been charged to a predetermined value, and an output circuit for said glow relay tube including a second condenser and means responsive to current flow in said output circuit, for indicating the quantity of electromagnetic radiations emanating from said source over a definite period of time.

5. A system for measuring the quantity of radiations emanating from a source of electromagnetic radiations comprising a glow relay tube provided with two anodes and a common cathode, with one of said anodes being spaced closer to said cathode than the other of said anodes and positioned out of the direct discharge path between the other of said anodes and said cathode to inherently cause a definite and constant breakdown potential being required to initiate a discharge between said cathode and the anode spaced in closer proximity thereto regardless of the potential impressed between the other of said anodes and said cathode, an input circuit for said glow relay tube including means subjectable to radiations from said source whose resistance varies with variations in intensity of the radiations emanating from said source, and a source of electrical potential, all in electrical series relationship; and a condenser connected in electrical parallel relationship with said glow relay tube adapted to be charged by said source of electrical potential solely by current flow through said means and only when the same is subjected to said source of electromagnetic radiations and at a rate proportional to the intensity of the radiations falling upon said means, and operable to cause breakdown of said glow relay tube upon being charged to a predetermined value; and an output circuit for said glow relay tube including said source of electrical potential, a second condenser adapted to be charged by said source to a potential sufficient only to sustain a discharge in said glow relay tube once it has been initiated by discharge of said first mentioned condenser, and means responsive to discharge of said last mentioned condenser upon breakdown of the glow relay tube with attendant current flow in said output circuit for indicating the quantity of electromagnetic radiations emanating from said source over a definite period of time.

6. A system for measuring the quantity of radiations emanating from a source of electromagnetic radiations comprising a glow relay tube provided with two anodes and a common cathode with one of said anodes being spaced closer to said cathode than the other of said anodes and positioned out of the direct discharge path between the latter and said cathode to inherently cause a definite and constant breakdown potential being required to initiate a discharge between said cathode and the anode spaced in closer proximity thereto regardless of the potential impressed between the other of said anodes and said cathode, an input circuit for said glow relay tube including a photoelectric cell subjectable to radiations from said source whose resistance varies with variations in intensity of the radiations emanating from said source, and a source of electrical potential, in electrical series relationship, and a condenser connected in electrical parallel relationship with said glow relay tube adapted to be charged by said source of electrical potential solely by current flow through said photoelectric cell and only when the same is subjected to said source of electromagnetic radiation and at a rate proportional to the intensity of radiations falling upon said photoelectric cell, and operable to discharge and cause breakdown of said glow relay tube upon being charged to a predetermined value; and an output circuit for said glow relay tube including said source of electrical potential and the winding of a relay, a condenser in said output circuit between said source of electrical potential and said relay winding in electrical parallel relationship to said glow relay tube and operable to impress a potential upon said glow relay tube sufficient only to sustain a discharge once it has been initiated by discharge of said condenser in said input circuit, means in said output circuit for controlling the charging rate of said last mentioned condenser, and means actuable by said relay upon discharge of the condenser in said output circuit for indicating the quantity of radiations emanating from said electromagnetic radiation source over a definite period of time.

7. A system for measuring the quantity of radiations emanating from a source of electromagnetic radiations comprising a glow relay tube provided with two anodes and a common cathode with one of said anodes being spaced closer to said cathode than the other of said anodes and positioned out of the direct discharge path between the latter and said cathode to inherently cause a definite and constant breakdown potential being required to initiate a discharge between said cathode and the anode spaced in closer proximity thereto regardless of the potential impressed between the other of said anodes and said cathode, a circuit including an electromagnetic radiation responsive device subjectable to radiations emanating from said source whose resistance varies in response to the quantity of radiations falling thereon, a source of electrical potential, and a condenser adapted to be charged by said source of electrical potential solely by current flow through said radiation responsive device and only when the same is subjected to said source of electromagnetic radiations and at a rate proportional to the intensity of the radiations falling upon said radiation responsive device, all in electrical series relationship; a second circuit including said condenser and said cathode and one of said anodes of said glow relay tube and operable to cause breakdown of said glow relay tube with attendant complete discharge of said condenser when the potential thereof reaches a definite value; a third circuit including said source of electrical potential, a second condenser adapted to accumulate a charge from said source of electrical potential limited only to a value sufficient to sustain a discharge in said glow relay tube once it has been initiated by discharge of said first mentioned condenser, and a current limiting device controlling the rate of charging of said second condenser by said source, all in electrical series relationship; and another circuit including the remaining anode and said cathode of said glow relay tube, said second condenser and means operable to cause the operation of mechanism to indicate the quantity of electromagnetic radiations emanating from said source of radiations over a definite period of time, in electrical series relationship; said second mentioned condenser being operable to discharge and actuate said last mentioned means upon breakdown of said glow relay tube in response to discharge of said first mentioned condenser.

8. A system for measuring the quantity of radiations emanating from a source of electromagnetic radiations comprising radiation responsive means subjectable to radiations emanating from said source, a source of electrical potential and a condenser adapted to be charged by said source of electrical potential solely by current flow through said radiation responsive means and only when the same is subjected to said source of electromagnetic radiations, all in electrical series relationship; a glow relay tube provided with two anodes and a common cathode with one of said anodes being spaced closer to said cathode than the other of said anodes and positioned out of the direct discharge path between the latter and said cathode to inherently cause a definite and constant breakdown potential being required to initiate a discharge between said cathode and the anode spaced in closer proximity thereto regardless of the potential impressed between the other of said anodes and said cathode, one of said anodes and said cathode being connected in series with said condenser, a circuit including said source of electrical potential, a condenser and a current limiting device in electrical series relationship; a further circuit including said second condenser, the remaining anode and cathode of said glow relay tube and means operable to cause operation of mechanism to indicate the quantity of radiations emanating from said source of electromagnetic radiations over a definite period of time, all in electrical series relationship; and said second mentioned condenser being operable to discharge through said glow relay tube and through said last mentioned means upon breakdown of said glow relay tube by the discharge of said first mentioned condenser.

HARVEY CLAYTON RENTSCHLER.